US006902387B2

(12) United States Patent
Cziraky

(10) Patent No.: US 6,902,387 B2
(45) Date of Patent: Jun. 7, 2005

(54) CRAYON MAKER

(75) Inventor: David A. Cziraky, Bethlehem, PA (US)

(73) Assignee: Binney & Smith Inc., Easton, PA (US)

( * ) Notice: Subject to any disclaimer, the term of this patent is extended or adjusted under 35 U.S.C. 154(b) by 411 days.

(21) Appl. No.: 10/017,830

(22) Filed: Dec. 7, 2001

(65) Prior Publication Data

US 2003/0107152 A1 Jun. 12, 2003

(51) Int. Cl.[7] .................................... B29C 39/44

(52) U.S. Cl. .................... 425/144; 425/173; 425/259; 425/803; 425/DIG. 13; 425/DIG. 110; 264/299; 264/319; 249/78

(58) Field of Search ............................ 425/173, 259, 425/DIG. 13, DIG. 110, 803; 264/299, 319; 249/78

(56) References Cited

U.S. PATENT DOCUMENTS

| | | | | |
|---|---|---|---|---|
| 1,456,298 A | | 5/1923 | Carnes | |
| 2,025,069 A | | 12/1935 | Newton | |
| 2,195,960 A | | 4/1940 | Morris | |
| 2,470,043 A | | 5/1949 | Monsarrat | |
| 2,897,555 A | | 8/1959 | Nishikiori | |
| 3,063,109 A | | 11/1962 | Rapaport | |
| 3,166,792 A | | 1/1965 | Goldfarb | |
| 3,179,980 A | | 4/1965 | Ryan et al. | |
| 3,214,567 A | | 10/1965 | Chisholm | |
| 3,313,918 A | | 4/1967 | Barber | |
| 3,317,708 A | | 5/1967 | Bowling | |
| 3,368,063 A | | 2/1968 | Kuhn | |
| 3,410,988 A | | 11/1968 | Nagel | |
| 3,412,235 A | | 11/1968 | Hild et al. | |
| 3,412,236 A | | 11/1968 | Hild et al. | |
| 3,448,244 A | | 6/1969 | Filipak | |
| 3,462,584 A | | 8/1969 | Guy | |
| 3,468,366 A | | 9/1969 | Suddarth | |
| 3,521,032 A | | 7/1970 | Heuss | |
| 3,548,146 A | | 12/1970 | Hoyland | |
| 3,549,862 A | | 12/1970 | Holtkamp et al. | |
| 3,619,564 A | | 11/1971 | Schauer, Jr. | |
| 3,625,197 A | * | 12/1971 | Pirker | 126/273 R |
| 3,639,727 A | | 2/1972 | Leach | |

(Continued)

OTHER PUBLICATIONS

Easy–Bake Oven & Snack Center, photocopies of box and instructions, photograph of product, © 1997, Hasbro Canada Inc.
Metal Molder Die Cast Factory, photocopies of box, photograph of product, © 1998 Toymax Inc., Plainview, N.Y.
Metal Moulder Metal Pellet Refill, photocopies of box, photograph of product, © 1997 Toymax Inc., Westbury, N.Y.
Metal Moulder Space Ships Metal Moulding Kit, photocopies of box, photograph of product, © 1997 Toymax Inc., Westbury, N.Y.
Creepy Crawlers Bug Maker, photocopies of box and photograph of product, © 2000 Toymax Inc., Plainview, N.Y.
Nickelodeon Nick–tivities, Melt–O–Matic, photocopies of box and instructions, photograph of product, © 2000 Fly Colors Toys Inc., Malibu, CA.
Super Injector, photocopies of box and photograph of product, © 1998 Toymax Inc., Plainview, N.Y.
Super Injector, Aliens Mold 'N' Play Set, photocopies of box and photograph of product, © 1998 Toymax Inc., Plainview, N.Y.

*Primary Examiner*—Stefan Staicovici
(74) *Attorney, Agent, or Firm*—Leydig, Voit & Mayer, Ltd.

(57) ABSTRACT

An apparatus for making crayons is provided. The apparatus includes a base that houses a heating component, a melt pan disposed to absorb heat from the heating component, a mold, and a cover. The melt pan receives crayon material and contains it as the heating component increases the temperature, causing the crayon material to liquefy. The liquefied crayon material can then be drained by the user of the device, into a mold with crayon-shaped cavities. A cover prevents access to the melt pan and the mold during particular operating conditions of the apparatus.

36 Claims, 14 Drawing Sheets

U.S. PATENT DOCUMENTS

| | | | | |
|---|---|---|---|---|
| 3,648,011 A | | 3/1972 | Holtkamp | |
| 3,659,068 A | | 4/1972 | Duffner et al. | |
| 3,702,920 A | | 11/1972 | Taylor | |
| 3,757,084 A | | 9/1973 | McLean et al. | |
| 3,823,294 A | | 7/1974 | Takayama et al. | |
| 3,875,372 A | | 4/1975 | Gilliom | |
| 3,957,408 A | | 5/1976 | Clymer et al. | |
| 4,082,491 A | | 4/1978 | Clymer et al. | |
| 4,089,319 A | | 5/1978 | Tamada et al. | |
| 4,186,295 A | | 1/1980 | Iwao | |
| 4,188,009 A | | 2/1980 | Gillespie | |
| 4,215,843 A | | 8/1980 | Gay et al. | |
| 4,224,814 A | * | 9/1980 | Bechtiger | 70/272 |
| 4,249,067 A | | 2/1981 | Cummings | |
| 4,293,899 A | * | 10/1981 | Sanner | 362/294 |
| 4,296,064 A | | 10/1981 | Satcher | |
| 4,298,788 A | | 11/1981 | Jones et al. | |
| 4,299,548 A | | 11/1981 | Saffer et al. | |
| 4,304,974 A | | 12/1981 | Ikeda et al. | |
| 4,316,079 A | | 2/1982 | Schmitz | |
| 4,340,806 A | | 7/1982 | Bergquist | |
| 4,345,144 A | | 8/1982 | Bergquist | |
| 4,374,320 A | | 2/1983 | Barnett | |
| 4,484,064 A | | 11/1984 | Murray | |
| 4,563,573 A | | 1/1986 | Hartelius et al. | |
| 4,616,123 A | | 10/1986 | Zagoroff | |
| 4,772,243 A | | 9/1988 | Zeiss | |
| 4,885,108 A | | 12/1989 | Richter | |
| 4,927,996 A | | 5/1990 | Genbauffe et al. | |
| 4,955,117 A | | 9/1990 | Crenshaw | |
| 5,315,091 A | | 5/1994 | O'Brien et al. | |
| 5,346,656 A | | 9/1994 | Shafir | |
| 5,422,458 A | | 6/1995 | Simmel | |
| 5,441,396 A | | 8/1995 | Nicetto | |
| 5,451,745 A | | 9/1995 | Goldberg et al. | |
| 5,453,000 A | | 9/1995 | Lebensfeld | |
| 5,528,014 A | | 6/1996 | Goldberg et al. | |
| D371,585 S | | 7/1996 | Lebensfeld | |
| 5,538,457 A | * | 7/1996 | Deal | 446/473 |
| 5,560,940 A | | 10/1996 | Breuil | |
| 5,597,593 A | | 1/1997 | Lebensfeld et al. | |
| 5,634,514 A | | 6/1997 | Gagliano | |
| D403,378 S | | 12/1998 | Lebensfeld et al. | |
| 5,858,262 A | | 1/1999 | Lebensfeld | |
| 5,866,085 A | | 2/1999 | Yelvington | |
| 5,954,115 A | | 9/1999 | Lebensfeld et al. | |
| 6,033,606 A | | 3/2000 | Garza | |
| 6,098,953 A | | 8/2000 | Machado | |
| 6,140,619 A | | 10/2000 | Couch | |

* cited by examiner

CRAYON MAKER

FIELD OF THE INVENTION

This invention is directed generally to the category of toys and, more particularly, to an apparatus for making crayons.

BACKGROUND OF THE INVENTION

Crayons have long been used as a children's playtime staple. Their educational and developmental value are well-known. Due to their nature, however, crayons wear down to small pieces with use. Moreover, popular colors wear down more quickly than those used less frequently, resulting in a wide variety of crayon shapes and sizes, from what was once a uniformly-sized collection.

Unfortunately, the smaller pieces become difficult to use and store in their original container. As a result, they lose some of their play value, and tend to cause clutter. This results in waste, because crayons are typically sold as a collection, not individually, thus requiring the purchase of an entire collection to replace worn individual colors. Evidently, there exists a need for an apparatus that facilitates crayon recycling. Such a device, configured as an interactive toy, would fulfill this need, and provide a fun activity for children.

Moreover, it is generally accepted that interactive toys have a high play value for children, particularly when such toys give children the feeling of being grown up or doing something that adults do. The play value of an interactive toy is further enhanced, particularly in the eyes of parents, when the toy incorporates scientific or educational aspects such as environmental consciousness, recycling, and the observation of physical states of matter or color theory.

Of course, children's toys must be designed for safety, including protection from potential hazards such as heated components, and the like. In addition to safety, parents value other benefits, such as the reduction or elimination of messy play conditions, and increased economic value, reflected in low cost and the capability to recycle and reuse other toys, like crayons.

The invention described herein embodies such features and advantages, thus providing a fun, safe and educational toy for children, with considerable benefits for their parents.

BRIEF SUMMARY OF THE INVENTION

An apparatus for making crayons is provided. The apparatus incorporates a base that houses a heating element. The heating element increases the temperature of a melt pan, in order to melt crayon material placed thereon. The melt pan is hinged at one end such that it can rotate between a flat, melting position, and an inclined pouring position from which molten crayon material will flow.

From the inclined melt pan, the molten crayon material flows into a crayon mold. The mold may be divided into two or more easily separable pieces so that the finished crayons may be removed from the mold after they have cooled. The mold may also be removable from the base portion in its entirety. This allows the user to disassemble the mold in a more convenient location than if it were fixed to the base.

Also attached to the base is a hinged cover that a user may pivot between an open and a closed position. In its closed position, the cover enshrouds the components of the device that are heated, including the heating element, the mold, and the melting pan, to protect the user from contacting the heated components.

The apparatus further includes a timer-operated locking mechanism for securing the cover in its closed position. This is an important safety feature of the device, as it protects a user from exposure to the heated components of the toy, namely the melt pan and the mold. By turning a knob that sets the timer, a user winds a drive shaft attached to a coil spring, that, when released, rotates the drive shaft via a series of reduction gears. The drive shaft, in turn, rotates a cammed and slotted disc. The slot engages a lever that slides a locking bar into a receiving notch in the cover. The locking bar locks the cover in the closed position until the spring has rotated the disc such that the slot moves the lever to its non-locking position after a predetermined time, thus disengaging the locking bar from the receiving notch in the cover.

The cam on the disc engages and operates a switch that controls power to the heating element. When the timer is set, the disc cam closes the switch, thus energizing the heating element as the locking bar locks the cover. As the timer spring unwinds, the crayon material melts, and the cam portion of the disc reaches the point where it opens the switch, thus turning off the heat source. At this point, the user can incline the melt pan, causing the molten crayon material to flow into the mold, all while the timer continues to run. After a preset time, the disc slot pivots the locking lever to its unlocked position, thus moving the locking bar out of the cover receiving slot and allowing the cover to be opened. The user can, at this point, disengage the mold from the base and remove the cooled, newly formed crayons from the mold.

DETAILED DESCRIPTION OF THE INVENTION

Figure 1:
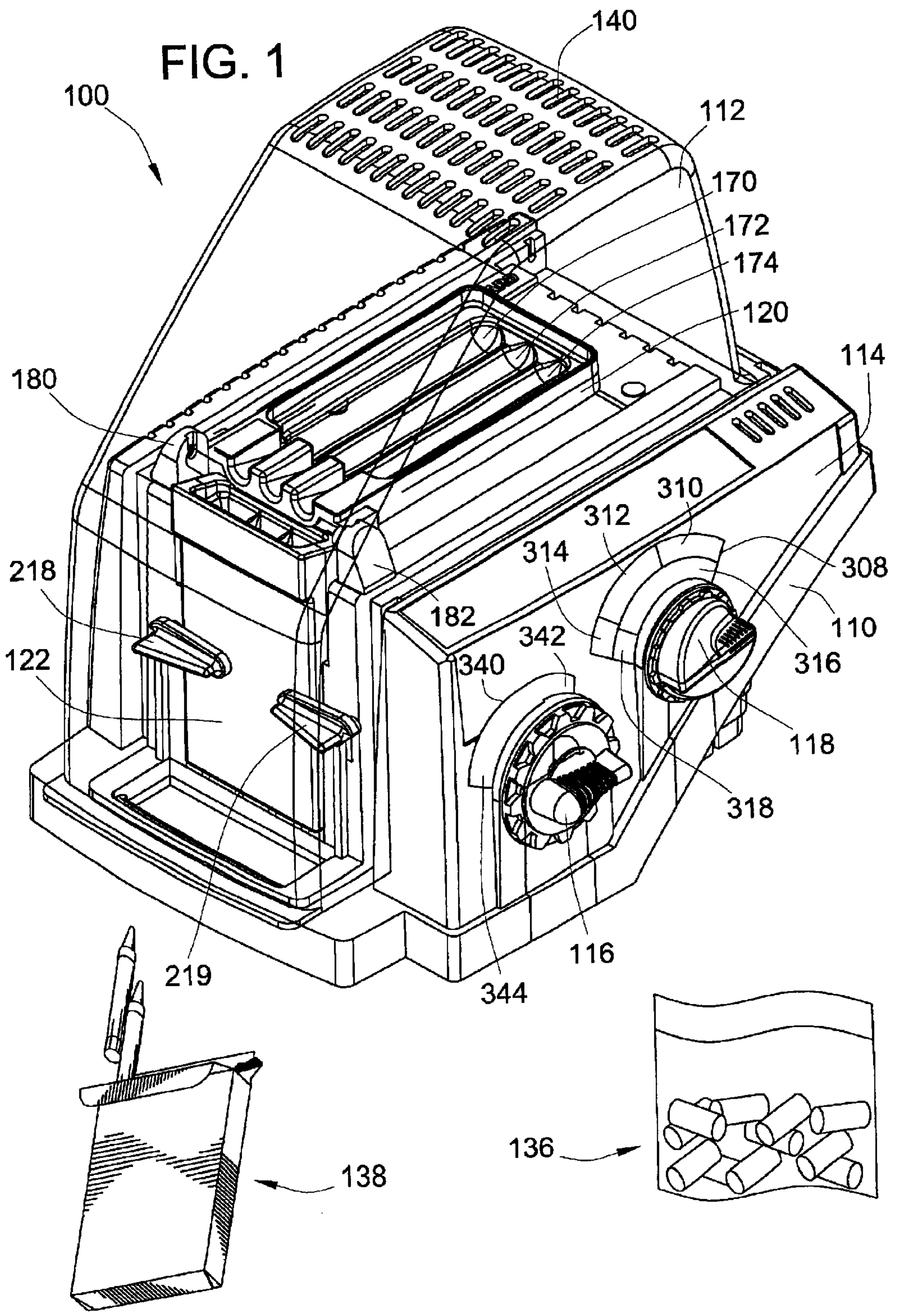
FIG. 1 is a perspective view of the crayon making apparatus of the invention.
Figure 2:
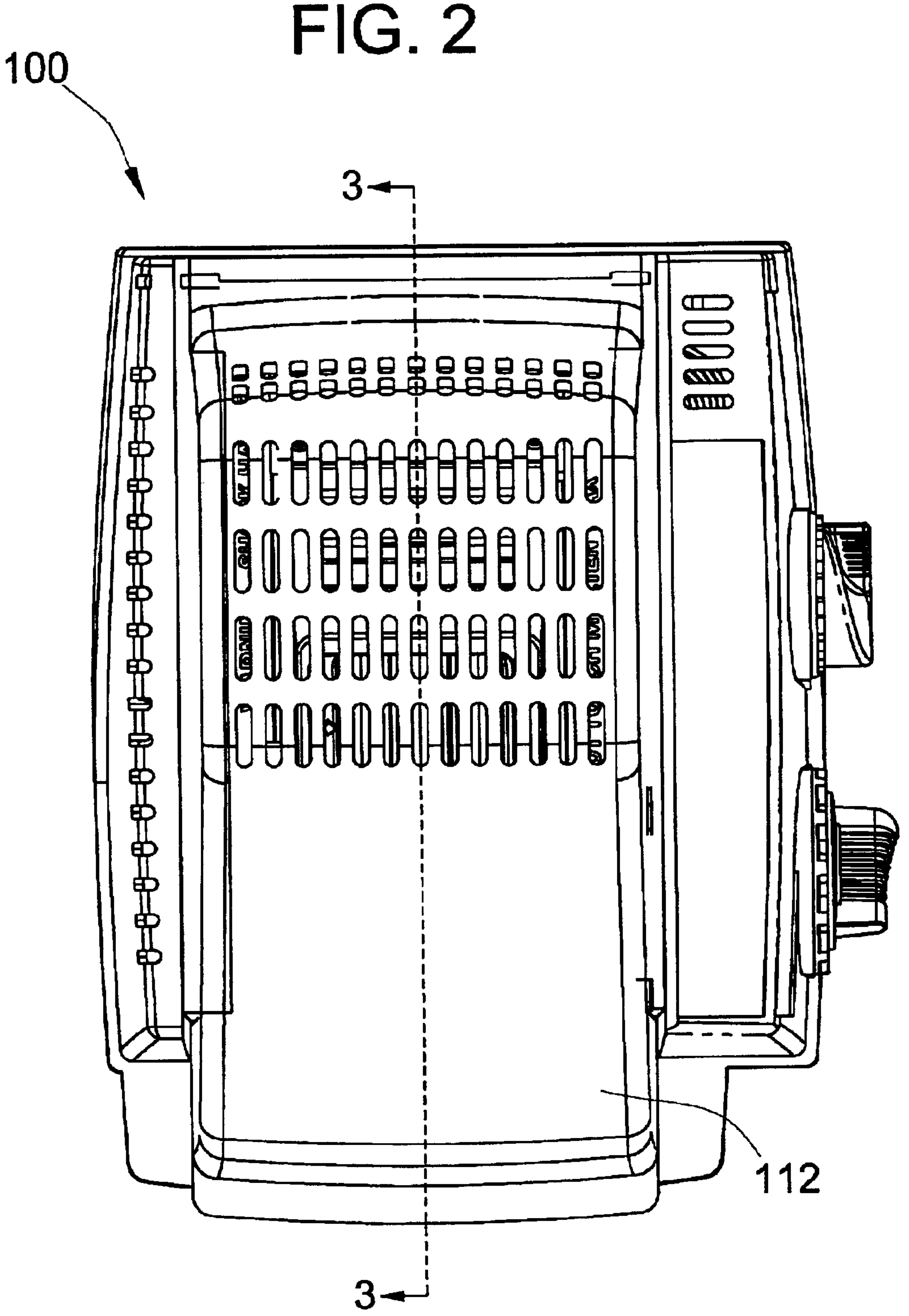
FIG. 2 is a top view of the crayon making apparatus shown in FIG. 1.

FIG. 1 illustrates an embodiment of the crayon making apparatus 100 including a base 110 and a cover 112 hingedly connected to the base. The right side panel 114 of the base 110 includes the operating controls of the device. Specifically, these include the tilting knob 116 and the timer control 118. The tilting knob 116 rotates a melt pan 120, hingedly attached to the base, between a flat position, as shown in FIG. 3, wherein crayon material is received and heated until it melts, and an inclined position from which the melted crayon material flows into a mold 122, as shown in FIG. 4

Figure 3:
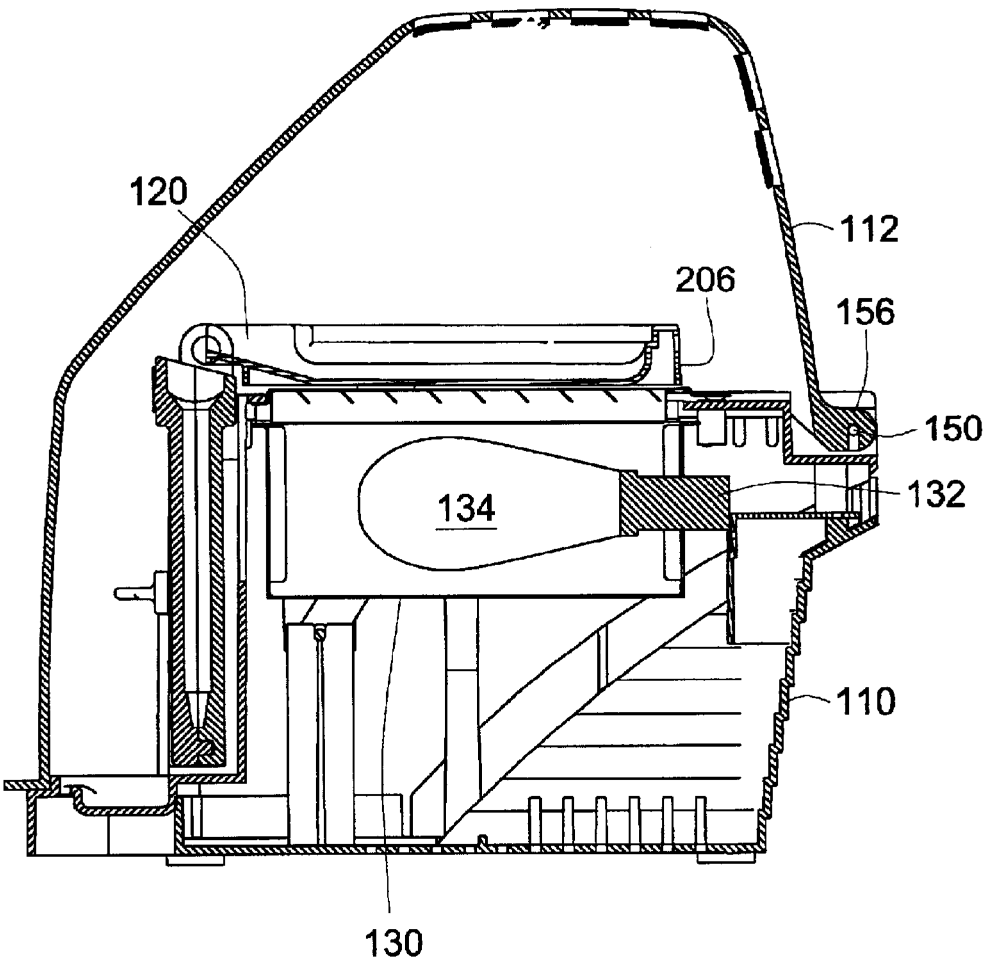
FIG. 3 is a sectional view of the invention shown in FIG. 2, taken along line 3—3.
Figure 4:
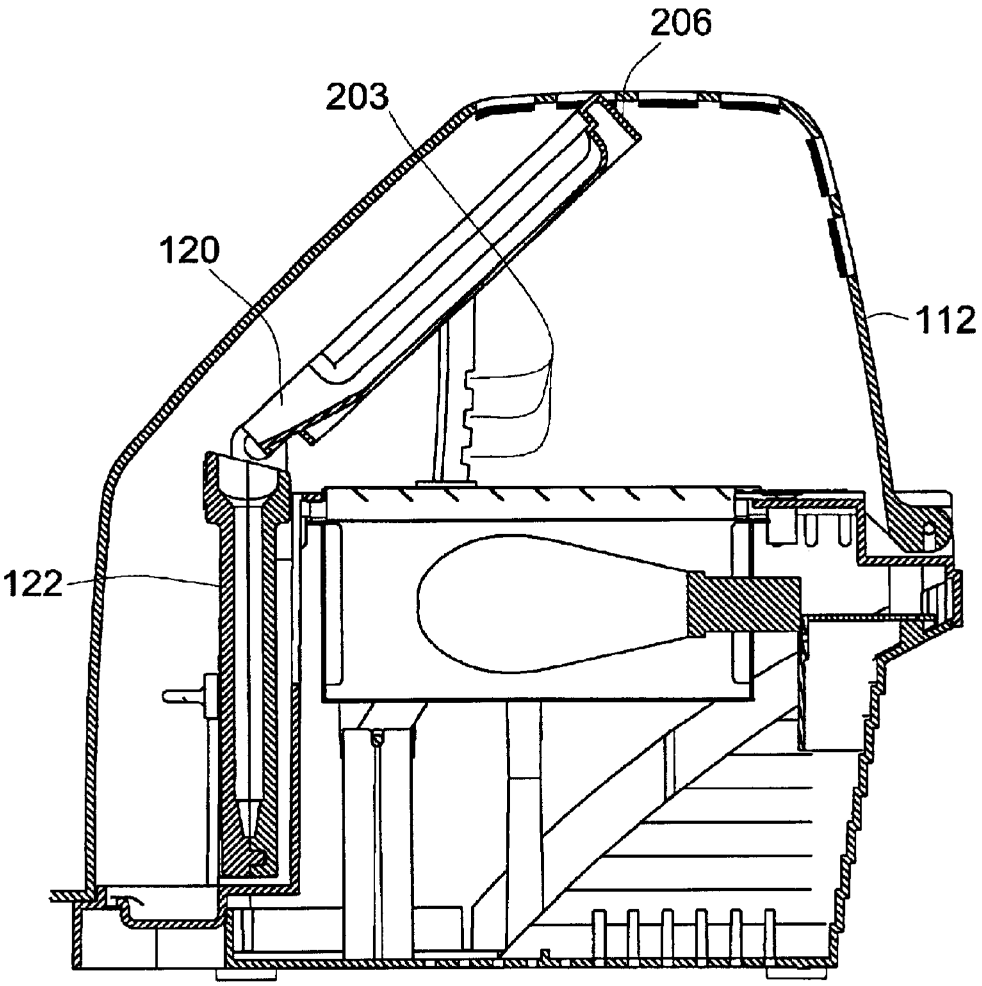
FIG. 4 is a sectional view of the invention shown in FIG. 2, taken along line 3—3, wherein the melt pan is in its inclined position.
Figure 5:
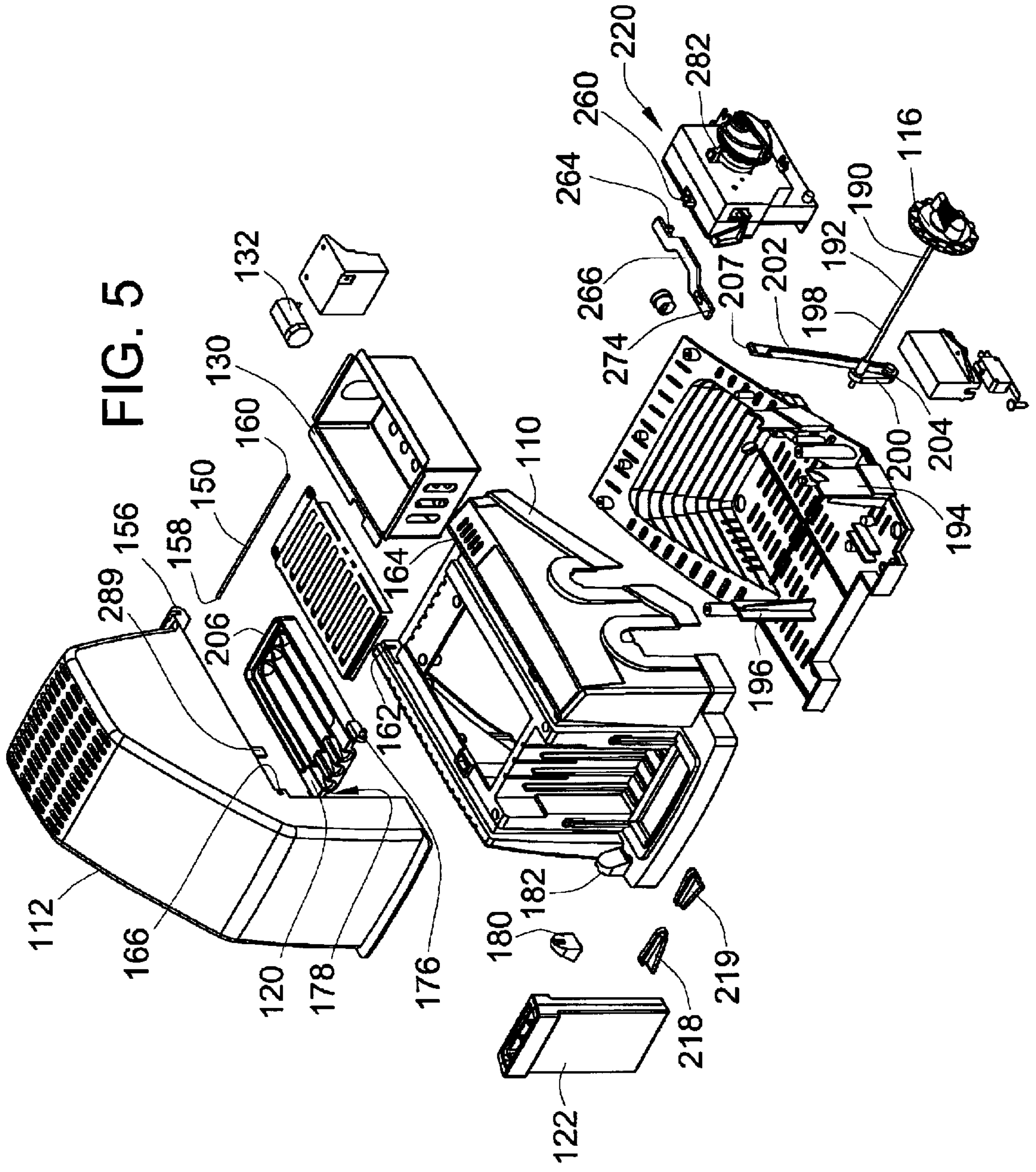
FIG. 5 is an exploded view of the invention.

FIGS. 3 and 5 illustrate the heating components of the invention which heat crayon material placed upon the melt pan 120, thus melting and liquefying it. The heating components include an enclosure 130, a socket 132 and a heating bulb 134, all of which may be disposed within the base 110. In this embodiment, the bulb 134 is located beneath the melt pan 120, and, as such, radiantly heats the melt pan 120 in order to melt crayon material placed thereon by a user. Of course, other types of heat sources may be used, without deviating from the inventive concept. For example, a resistance heating element may be conductively coupled to the melt pan 120. In another example, the heat source may be a hot liquid source.

The crayon material may be used crayons or new crayons. The labels would be removed from the crayons prior to placement in the melt pan. In addition, the crayons may be broken prior to placement in the melt pan. For example, the crayon making apparatus may be sold as a kit which includes a bag 136 of broken or unbroken new crayons with or without labels or a box 138 of unbroken or broken new crayons with or without labels as shown in FIG. 1. In addition, the crayon material may be pellets of crayon material for use with the crayon making apparatus. The pellets may be included with the crayon making apparatus or may be sold separately. The pellets may be packaged in pre-portioned bags. The portions may correspond to the amount of crayon material needed to make a predetermined number of crayons, such as, one crayon, two crayons, three crayons, or four or more crayons. Furthermore, the pellets may be colored or uncolored. If the pellets are uncolored, a coloring additive may be included with the crayon making apparatus or may be sold separately. In addition, the user can mix new or used crayon pieces with the pellets.

To prevent a user from contacting the melted crayon material, the melt pan 120 and the various heating components, including the enclosure 130 and the heating bulb 134, the cover 112 of the invention enshrouds them during the operating conditions described below. In this embodiment, the cover 112 is made of a clear plastic material that enhances the play value of the invention by allowing a user to see the various operations of melting the crayon material and pouring the material into the mold. However, in other embodiments, the cover 112 may be made of an opaque, or semi-opaque material, without deviating from the scope of the invention. Additionally, the cover may include one or more vents 140, as shown in FIG. 1, to facilitate cooling of the heated components.

Figure 6:
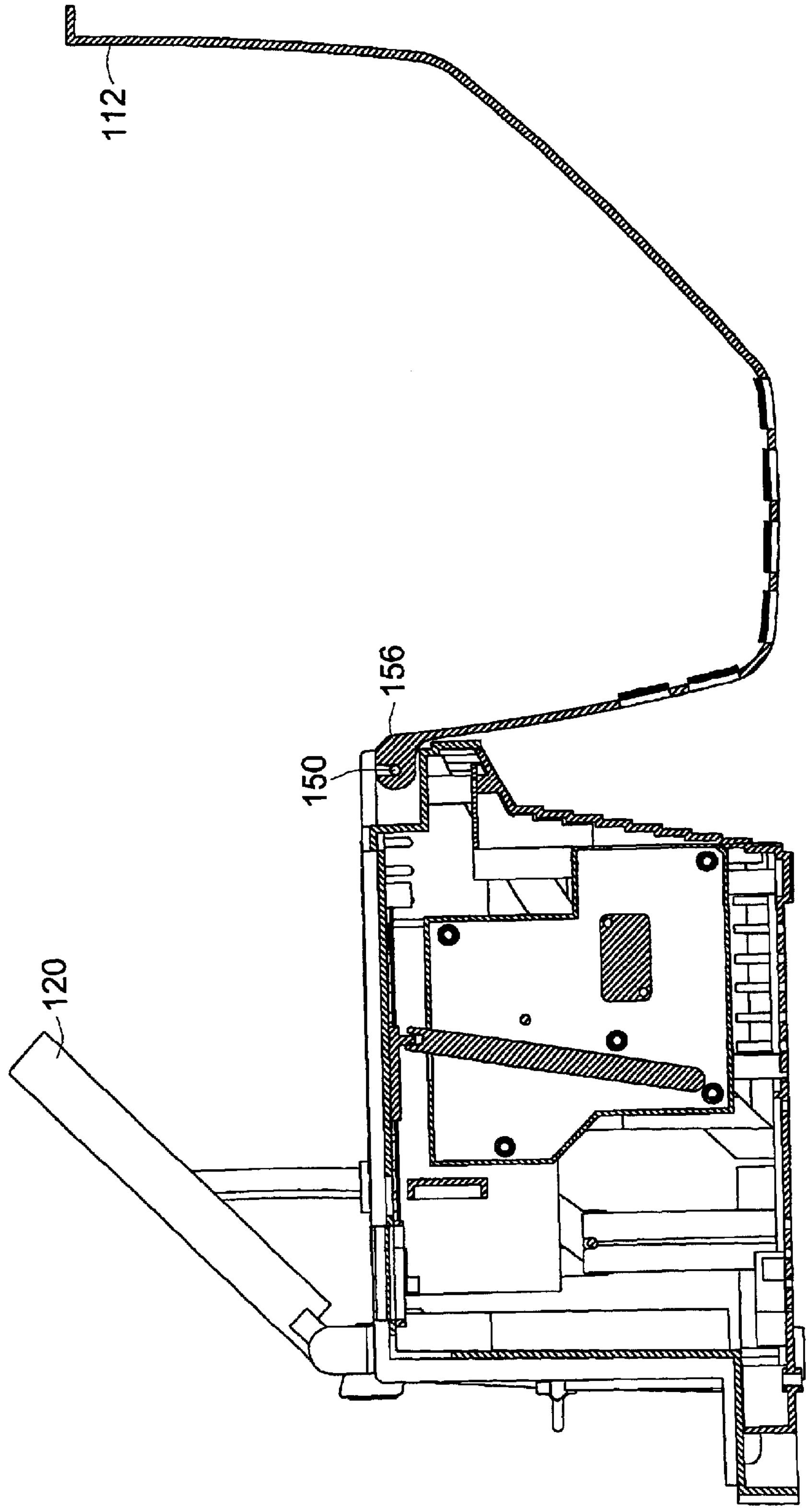
FIG. 6 is a sectional view of the invention shown in FIG. 2, taken along line 3—3, illustrating the melt pan in its inclined position, and the cover in its open position.
Figure 7:
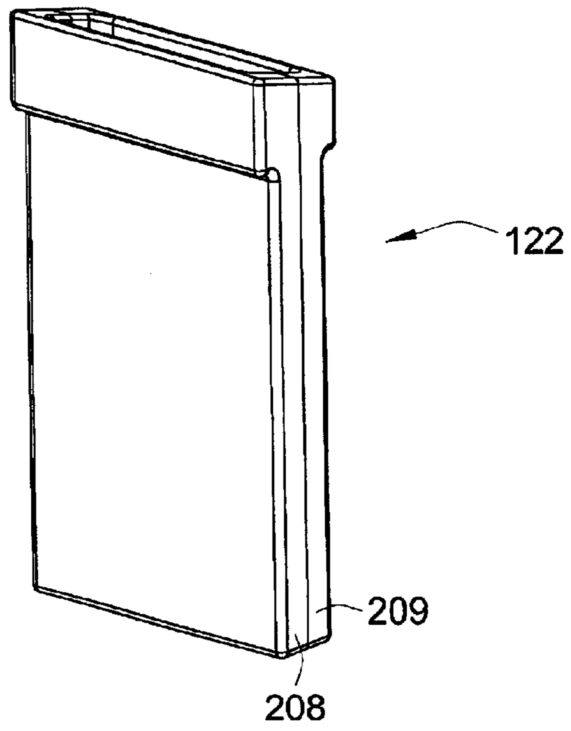
FIG. 7 is a perspective view of the mold component of the present invention.
Figure 8:
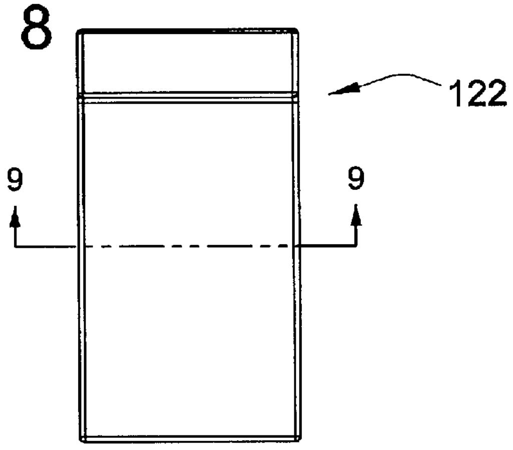
FIG. 8 is a front view of the mold component of the present invention.
Figure 9:
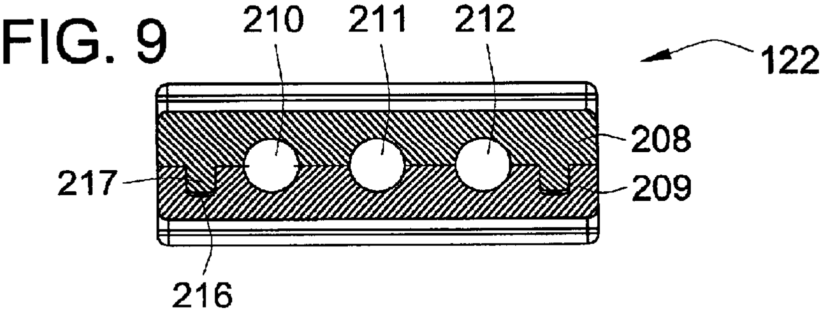
FIG. 9 is a sectional view of the mold component shown in FIG. 8, taken along line 9—9.
Figure 10:
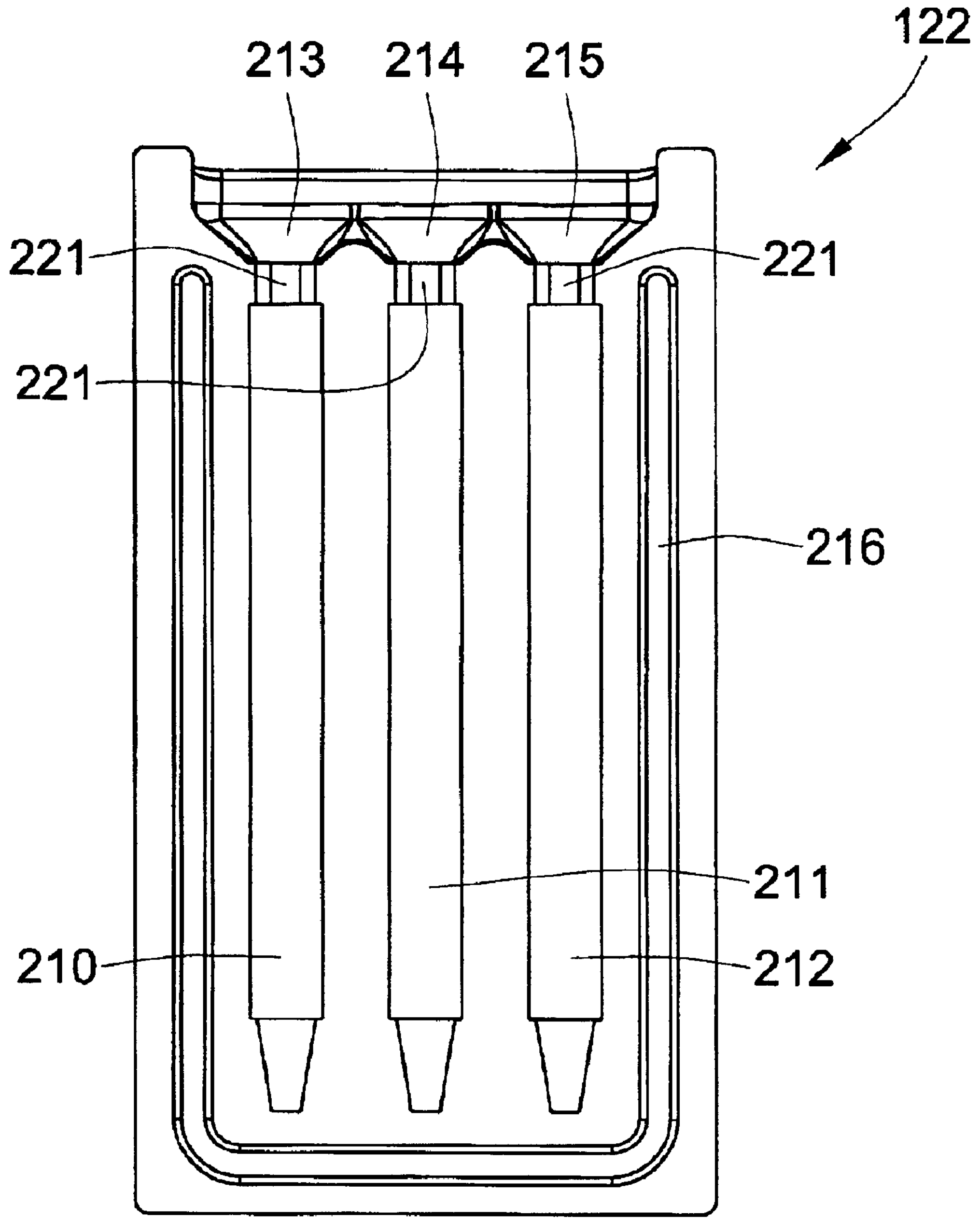
FIG. 10 is a plan view of the lower half of the mold component of the invention.

As seen in FIGS. 3, 5 and 6, the cover 112 is hingedly connected to the base 110 by a hinge pin 150. The hinge pin 150 rests in a hinge block 156 of the cover 112, and the ends 158, 160 of the hinge pin 150 are received by the hinge pin sockets 162, 164 of the base 110. The hinge arrangement allows the cover 112 to rotate between a closed position, shown in FIG. 3, and an open position, shown in FIG. 6. The open position facilitates access under particular operating conditions such as when a user is placing crayon material on the melt pan 120, or removing newly molded crayons. The cover includes a locking slot 166 which, in conjunction with other components to be described below, facilitates the locking of the cover in the closed position under certain conditions. The cover 112 thus prevents a user from contacting heated components within the cover 12. However, the hinge construction described in connection with this embodiment is not to be construed as limiting this invention to this particular hinge arrangement. In contrast, various types of hinges can be used to facilitate a cover that rotates between an open and a closed position, including, among others, a living hinge or a multi-pin hinge design. Moreover, a cover may be employed that is not hingedly connected to the base, and is completely removable from the base in its open position.

As discussed above, and shown in FIG. 1, one of the components heated during operation of the invention is the melt pan 120. The melt pan 120 receives the crayon material placed thereon by a user, contains the material as it is melted, and facilitates pouring into a mold 122. In this embodiment, the melt pan 120 is a shallow, metal vessel with three channels 170, 172, 174, which receive the crayon material to be melted. It is to be noted that, in other embodiments, the mold can be manufactured of different materials and in different shapes without deviating from the scope of the invention. Moreover, the melt pan may include any number of melt channels, for example, one, two, four, five, six, or more, without deviating from the inventive scope. In this embodiment, the melting pan 120 is constructed of a heat-conducting metal, which facilitates efficient heat transfer from the heating bulb 134.

As previously discussed, the melt pan 120 is hingedly connected to the base 110 so that the melt pan 120 can be rotated between a flat, melting position, shown in FIG. 3, and an inclined, pouring position as shown in FIG. 4. Moreover, as shown in FIGS. 1 and 5, the melt pan 120 includes hinge pins 176, 178 which are received in hinge pin openings provided in tabs 180, 182 extending out of base 110. The hinge pins 176, 178 facilitate rotation of the melt pan 120, as a user rotates the tilting knob 116. Thus, a user deposits crayon material to be melted on the melt pan 120, and closes the cover 112. Upon activating the heating components and locking the cover 112, the crayon material liquefies, and the user tilts the melt pan 120 to pour the liquid into the mold 122.

The tilting knob 116 allows a user to control the operation of the melt pan 120 from outside the closed cover 112. As shown in FIG. 5, the tilting knob 116 is fixed to the knob end 190 of a tilting axle 192, such that when a user rotates the knob 116, direct rotation of the tilting axle 192 occurs. Inside the base 110, the tilting axle 192 rests on bearing columns 194, 196, that allow its free rotation. The link end 198, of the tilting axle 192, is fixed to an intermediate link 200 such that the link 200 rotates directly with the axle 192, and, ultimately, the tilting knob 116. The intermediate link 200 is further pivotally connected to a lifting arm 202, at arm joint 204. Thus, when the user rotates the tilting knob 116, the tilting axle 192 directly rotates in the same direction. This, in turn, causes a rotation of the intermediate link 200 about the tilting axle 192. The rotating motion of the intermediate link 200 causes the lifting arm 202 to reciprocate into or out of the housing 110, thus tilting or lowering the free end 206 of the melt pan 120, which freely rests upon the lifting end 207 of the lifting arm 202. This pivots the melt pan 120 between its flat melting position, as shown in FIG. 3, and its inclined position, as shown in FIG. 4, from which melted crayon material can flow into the mold 122. The lifting arm 202 may have notches 203 which engage a slot in the base 110. The notches 203 help to hold the melt pan 120 in an inclined position and which make a clicking noise when the melt pan 120 is raised and lowered. It is to be noted that other types of mechanisms for tilting the melt pan 120 may be incorporated into other embodiments of the invention without deviating from the inventive scope, such as those including gears, motors, solenoids, pistons, and the like.

In order to form the liquefied crayon material into new crayons, this embodiment of the invention incorporates a removable mold 122, as shown in FIGS. 7–10, which receives the liquefied crayon material draining from the inclined melt pan 120. The mold 122 of this embodiment is a two-piece mold, with a front half 208 and a rear half 209. The mold 122 includes three crayon-shaped cavities 210, 211, 212, corresponding to the melt pan channels 170, 172, 174. Thus, when the crayon material has melted and liquefied, the user tilts the melt pan 120, as described above, and the liquid crayon material drains from each of the melt pan channels 170, 172, 174 into the mold cavities 210, 211, 212. To facilitate the pouring of the crayon material, each mold cavity 210, 211, 212, may include a funnel shaped entryway 213, 214, 215. In addition, each mold cavity 210, 211, 212 may include an identification portion 221 below the funnel shaped entryway. In this embodiment, the identification portion 221 is hexagon-shaped. The identification portion helps to identify crayons made in the mold from crayons purchased by the user. The identification portion may have another shape, such as, triangle, rectangle, pentagon or other polygons, or may have other identifying features, such as, a mark or symbol.

In this embodiment of the invention, the mold may include a locking channel 216 in the rear mold half 209, that receives a locking bead 217 protruding from the front mold half 208. The locking bead 217 and the locking channel 216 cooperate when the mold halves 208, 209 are assembled, to provide a secure, sealed mold 122. Moreover, as illustrated in FIGS. 1 and 5, the mold 122 may be removable from the invention. The mold 122 may be secured in the base 110 of the invention by mold locking tabs 218 and 219. Each tab 218, 219 is pivotally attached to the base 110, such that rotating the tabs 218, 219 secures or releases the mold 122.

It is to be noted that, although the mold 122 has been described with a certain number of cavities and mold portions, any number of cavities or mold portions may be utilized while keeping within the scope of the invention. For example, the mold 122 may include 1, 2, 4, 5, 6, or more cavities to receive the liquid crayon material. Moreover, the mold 122 may be made up of 3, 4, 5, 6 or more components, without deviating from the scope of the invention. Additionally, one or more portions of the mold 122, or the entire mold, could be fixed to the base 110 of the invention, without deviating from its inventive scope.

Figure 17:
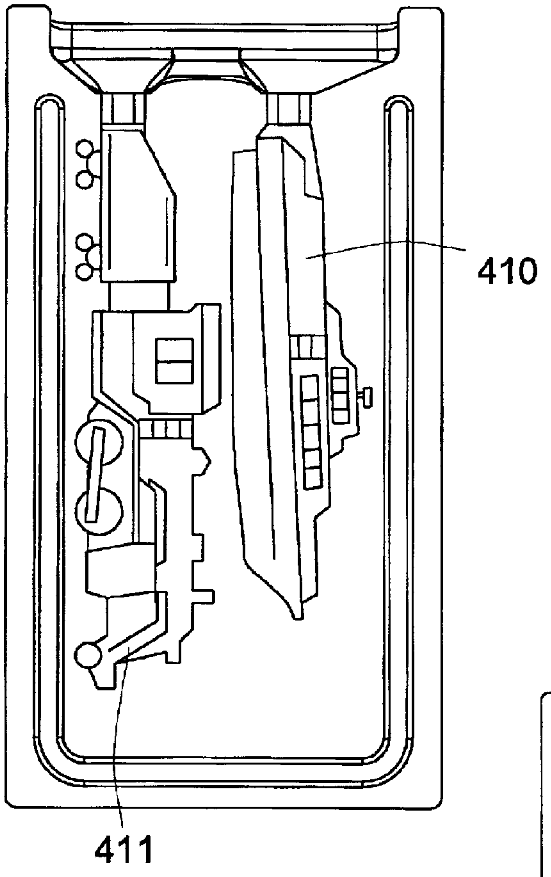
FIG. 17 is a plan view of another embodiment of a mold component of the invention.
Figure 18:
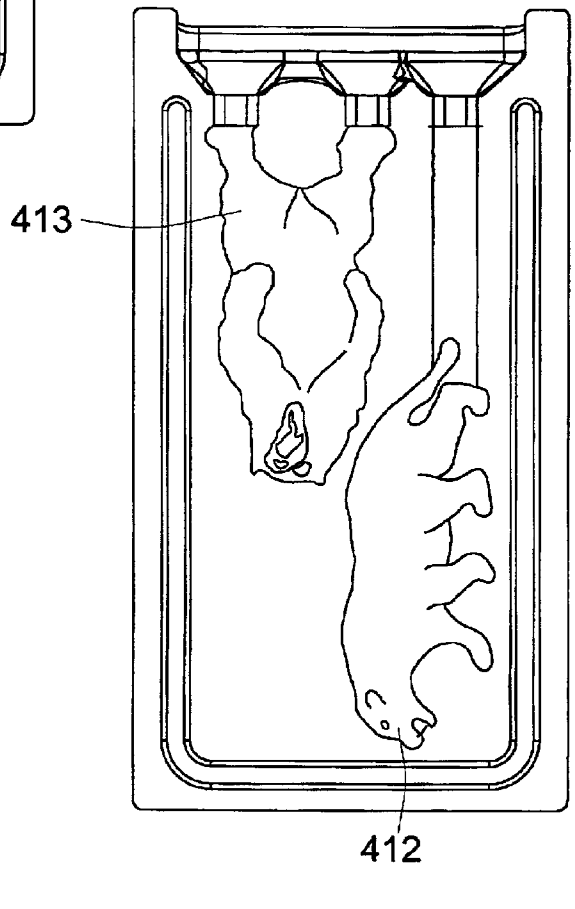
FIG. 18 is a plan view of another embodiment of a mold component of the invention.

In addition, the cavities may have different shapes. For example, the cavities may have the shape of vehicles, animals, characters, character accessories, game pieces, structures, monuments, celestial shapes, geometric shapes or other shapes. Referring to FIG. 17, the cavity 410 is in the shape of a boat and the cavity 411 is in the shape of a train. Referring to FIG. 18, the cavity 412 is in the shape of a lion and the cavity 413 is in the shape of a bear. Molds with cavities of various shapes may be included with the crayon making apparatus or may be sold separately.

In this embodiment, the mold 122 may be fabricated of a flexible, non-heat conductive material. This allows a user to take apart the mold halves 208, 209, and release the newly molded crayons from the mold 122 by flexing or twisting the mold halves 208, 209. However, other types of mold release mechanisms may be used without deviating from the scope of the invention. For example, retractable pins may be included in the mold to release the final molded product, or a mold release agent may be sprayed into the mold before molding, thus facilitating the release of the molded crayon. Additionally, many types of materials may be used in constructing the mold, not limited to flexible and non-conductive materials. For example, the mold may be formed out of metal, ceramic, or other rigid material without deviating from the scope of the invention. Thus, after the liquid crayon material is poured into the mold 122, it cools and solidifies, during which time the cover 112 is locked in the closed position for a predetermined time. Once the new crayons have solidified and cooled, the cover 112 may be opened and the newly formed crayons may be removed from the mold 122, as described above.

Figure 11:
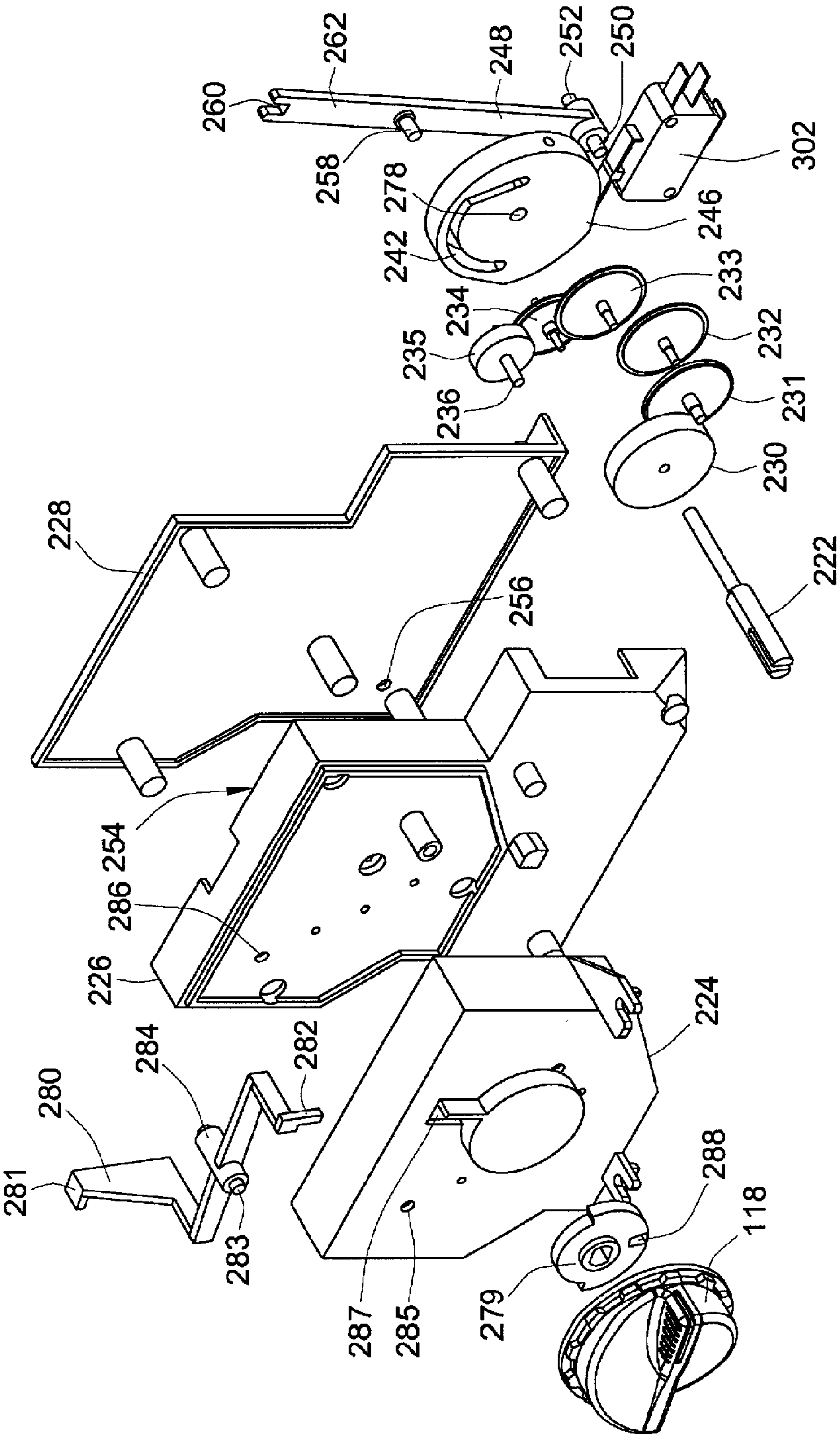
FIG. 11 is an exploded view of the timer component of the invention.

In order to lock the cover 112 in its closed position, thus protecting a user from the heated components of the device, this embodiment incorporates a timer 220, as shown in FIG. 5. FIG. 11, an exploded view of the timer 220, illustrates its component parts and their arrangement. A timer control knob 118, disposed outside the left side panel 114 of the base 100, is fixed to a timer main shaft 222. The shaft 222 extends from the timer control knob 118 through the left side panel 114, the timer gear cover 224, and the timer cam cover 226, nesting in the timer base 228. Between the gear cover 224 and the cam cover 226, the shaft 222 is fixed to a coil spring 230 that powers the timer 220 of this embodiment.

When the timer control knob 118 is rotated in the winding direction, the shaft 222 winds the spring 230 so that it naturally rotates the shaft 222 in the opposite (unwinding) direction after the control knob 118 is released. Thus, the timer operates by rotating the timer control knob 118 in the winding direction, and releasing it, thus allowing the spring 230 to unwind.

Figure 12:
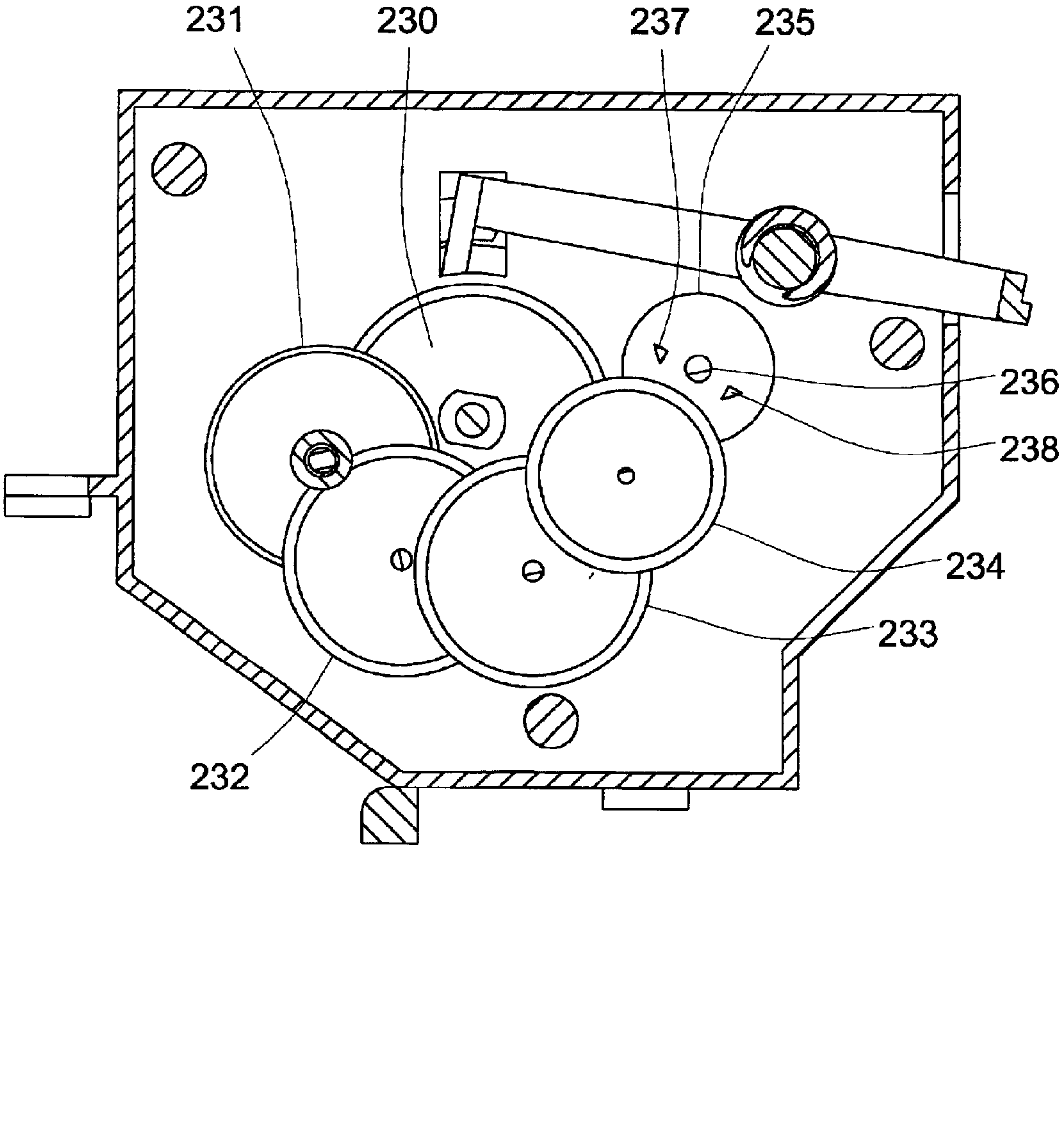
FIG. 12 is a cut-away end view of the gears and escapement of the timer component of the invention.

To provide a calibrated, gradual release of the spring's 230 energy, the spring 230 meshes with a set of serially meshed reduction gears 231, 232, 233, 234 that release the spring's 230 energy in a controlled, measured fashion. Moreover, an escapement 235 prevents acceleration of the spring's 230 controlled energy release by alternately meshing and disengaging with the reduction gear 234. As shown in FIG. 12, the escapement 235 may include a shaft 236 about which it pivots, and two teeth 237, 238 that alternately engage and disengage reduction gear 234 as it unwinds under the spring's 230 power. This incremental engagement and disengagement prevents the acceleration of the unwinding rate by controlling the speed of the gears 231, 232, 233, 234.

Figure 13:
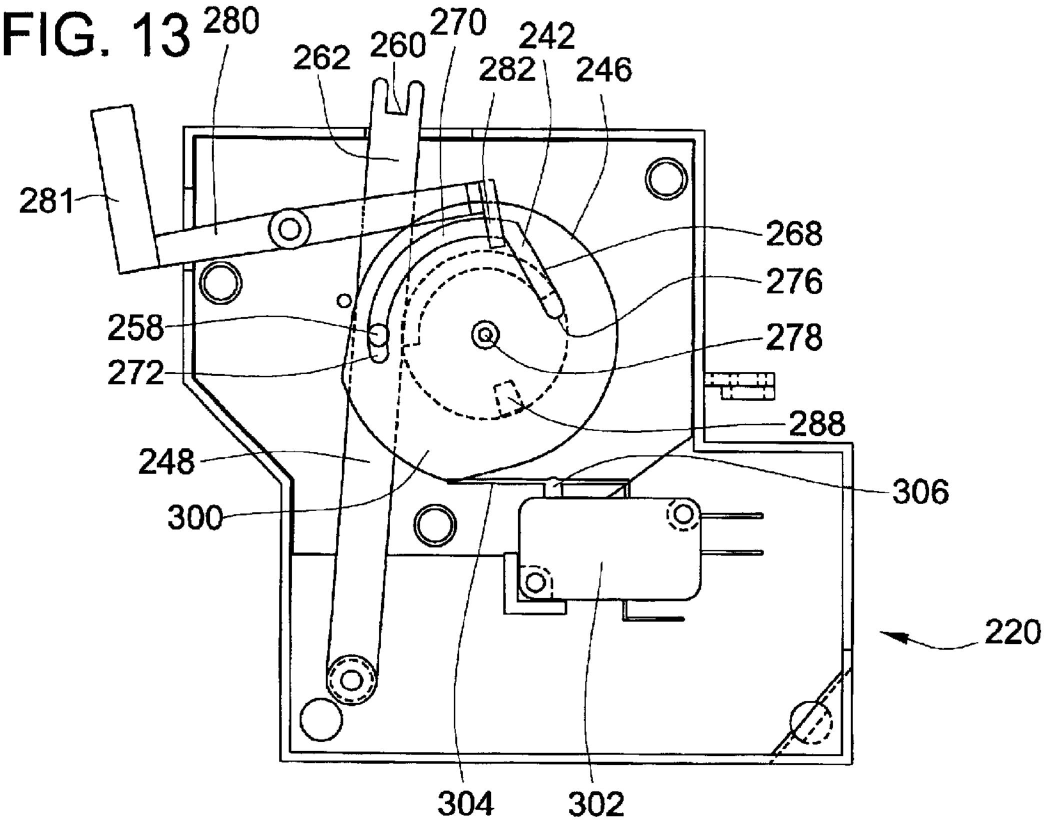
FIG. 13 is a cut-away end view of the timer component of the present invention shown in the "locked" state of the invention.
Figure 14:
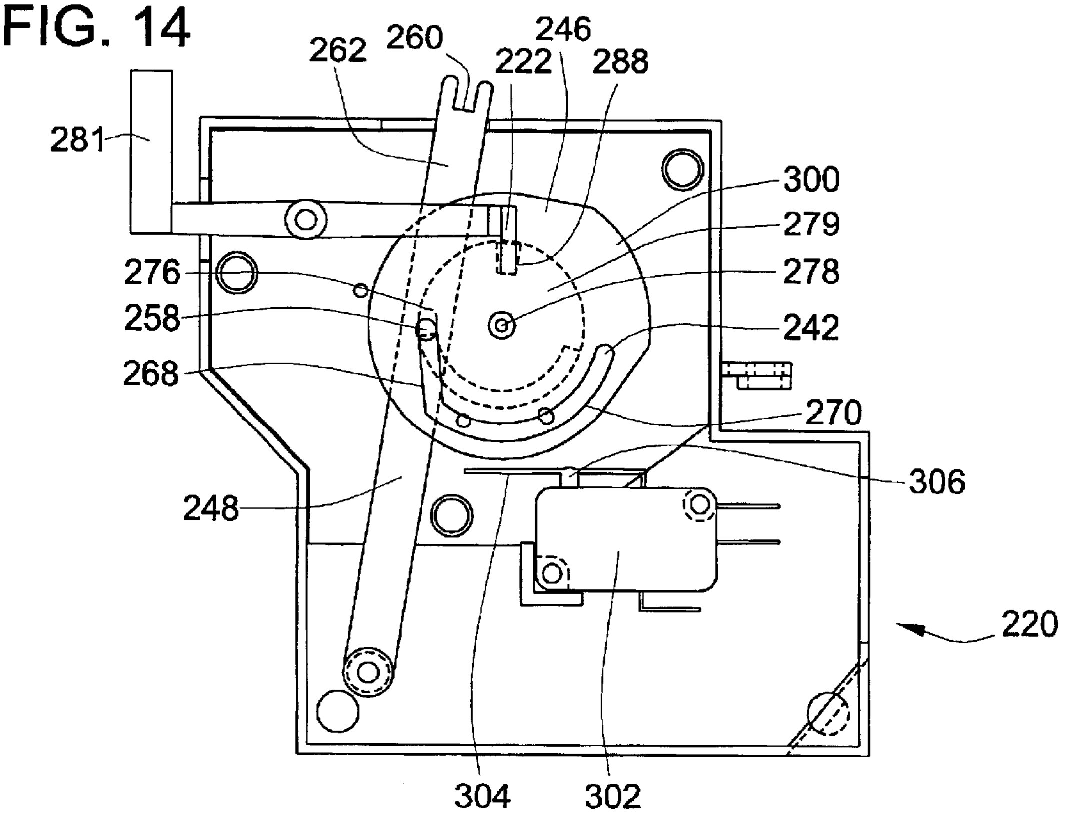
FIG. 14 is a cut-away end view of the timer components of the invention, shown in the "unlocked" condition.

The timer 220 locks and unlocks the cover 112 by means of a locking slot 242 in disc 246, that pivots a locking lever 248 between a locked position, as shown in FIG. 13, and an unlocked position, as shown in FIG. 14. The locking lever

248 pivots about pegs 250, 252 that are received in receptacles 254, 256. Near the midpoint of the lever 248, a slot peg 258 engages the locking slot 242 of disc 246. The locking lever further includes a notch 260 at its slide end 262, that receives a locking tab 264 of the slide bar 266.

Figure 15:
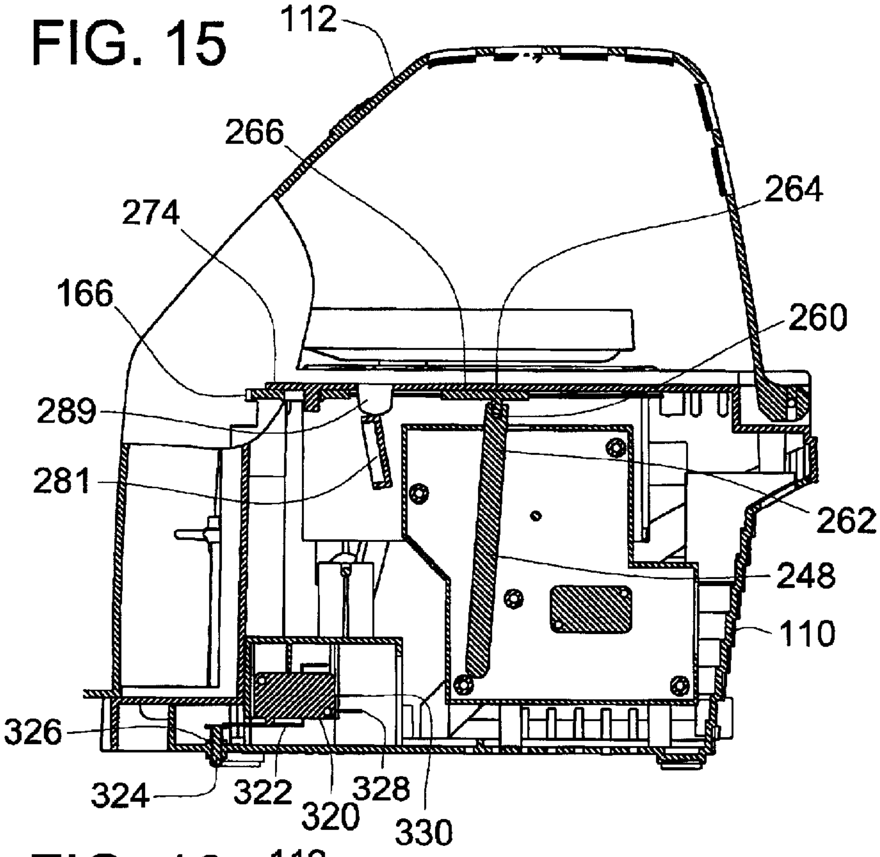
FIG. 15 is a cut-away side view of the apparatus of the invention, illustrating its "locked" state.
Figure 16:
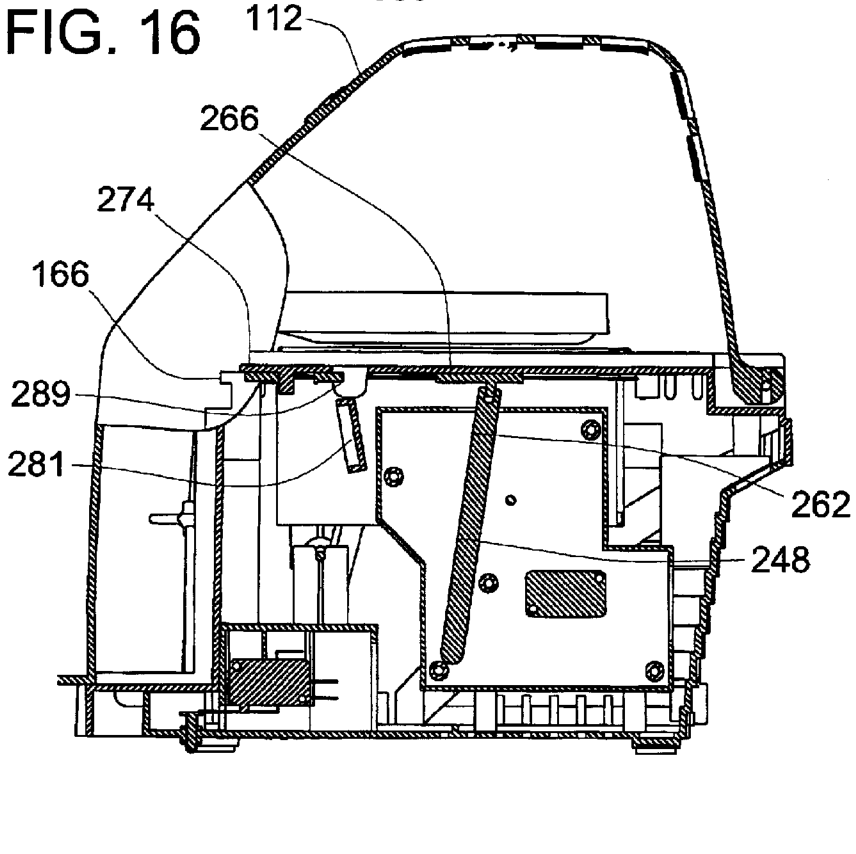
FIG. 16 is a cut-away side view of the apparatus of the invention, illustrating its "unlocked" state.

Referring to FIGS. 13 and 14, as the disc 246 rotates, the slot peg 258 moves along the slot 242, thus pivoting the lever 248. The slot 242 includes a straight leg portion 268 and a curved leg portion 270. As illustrated in FIG. 13, upon rotating the timer control knob 118 to its maximum winding position, the slot peg 258 is engaged at the locking end 272 of the curved leg portion 270. As a result, the slide end 262 of the locking lever 248 moves fully forward. As shown in FIG. 15, this causes the notch 260 of the locking lever 248 to push the locking tab 264 on the lock slide 266 forward, sliding an engagement end 274 of the lock slide 266 into engagement with the locking notch 166 of the cover 112. This secures the cover 112 in its closed position and prevents it from opening while the engagement end 274 remains engaged with the notch 166. As the spring 230 unwinds, rotating the disc 246, the slot peg 258 moves to the unlocking end 276 of the straight leg portion 268, as shown in FIG. 14, thus pivoting the slot peg 258 toward the center 278 of the disc 246. As shown in FIG. 16, the slide end 262 of the locking lever 248 thus pivots to its unlocked position, moving the engagement end 274 of the lock slide 266 out of engagement with the locking notch 166 of the cover 112, and allowing the cover to be opened. It is to be appreciated that other types of locking mechanisms may be used, without deviating from the inventive scope, such as a locking hook, a pin in a slot, a pin in a hole, a clasp or a coupler, among others.

As shown in FIGS. 5 and 11, to prevent the operation of the timer 220 while the cover 112 is open, the apparatus 100 includes a stop disc 279 and a pivot lever 280. The pivot lever 280 includes a tab 281 and pawl 282. As shown in FIG. 11, the pivot lever 280 pivots on pins 283, 284 that fit in to bearing recesses 285, 286, in the timer gear cover 224 and the timer cam cover 226. The pawl 282 extends through a pawl opening 287 in the timer gear cover 124, when the timer 120 is assembled.

When the cover 112 is in its open position, the pawl 282 drops into the notch 288 of the stop disc 279, as shown in FIG. 14. This prevents operation of the timer 120 when the cover 112 is open. However, when a user closes the cover 112, a cover tab 289 (see FIG. 5) depresses tab 281 of the pivot lever 280, causing the pawl 282 to disengage from the notch 288, as shown in FIG. 13. Once the pawl 282 is clear of the notch 288, the timer can be operated.

Referring again to FIGS. 13 and 14, the timer 220 may also control the functioning of the heating bulb 134 by means of a cam 300 on disc 246. Since it is fixed to the shaft 222, as described above, the disc 246 rotates with the shaft 222. A switch 302, which controls the flow of power to the bulb 134, is located in close proximity to the disc 246, such that the cam 300 can engage a switch actuator lever 304 when the cam 300 rotates into contact with the switch actuator 304. Thus, when a user winds the timer 220 by rotating the timer control knob 118 in the winding direction, the disc 246 rotates such that the cam 300 comes into contact with the switch actuator lever 304, depressing it and the switch plunger 306. This closes the switch 302, allowing current to flow to the heating bulb 134. Once the knob 118 is released, the spring 230 rotates the shaft 222, in turn rotating the disc 246 in the opposite direction. As a result, the cam 300 of the disc 246 disengages from the switch actuator lever 304 after a predetermined time, opening the switch 302 and cutting off the power source of the heating bulb 134. It is to be noted that the heating bulb may operate under AC or DC power, in keeping within the scope of the invention.

As the spring 230 continues to unwind, the further rotation of the disc 246 eventually unlocks the cover by operation of the locking lever 248, as described above. In order to allow for the heated components of the invention to cool, there may be included a delay between the opening of the switch 302, which turns off the heating bulb 134, and the unlocking of the cover 112. The delay may correspond to a predetermined time interval that allows for safe access to the now-cooled crayons and heatable components of the invention.

As the spring 230 unwinds, the timer control 118 also rotates. To indicate each step of the unwinding process the invention incorporates an indicator 308 disposed on the left side panel 114, as shown in FIG. 1. The indicator 308 may include graphic or textual display zones 310, 312, 314, that display the operating condition of the device as the timer 120 unwinds. The display zones 310, 312, 314, may also instruct the user to perform a particular function, such as pouring the crayon material into the mold 122, or opening the cover 112, at a predetermined time. For example, display zone 310 may indicate that the crayon material is being heated. Display zone 312 may indicate to the user to pour the liquid crayon material into the mold using the knob 116. Display zone 314 may indicate that the apparatus is cooling.

Figure 19:
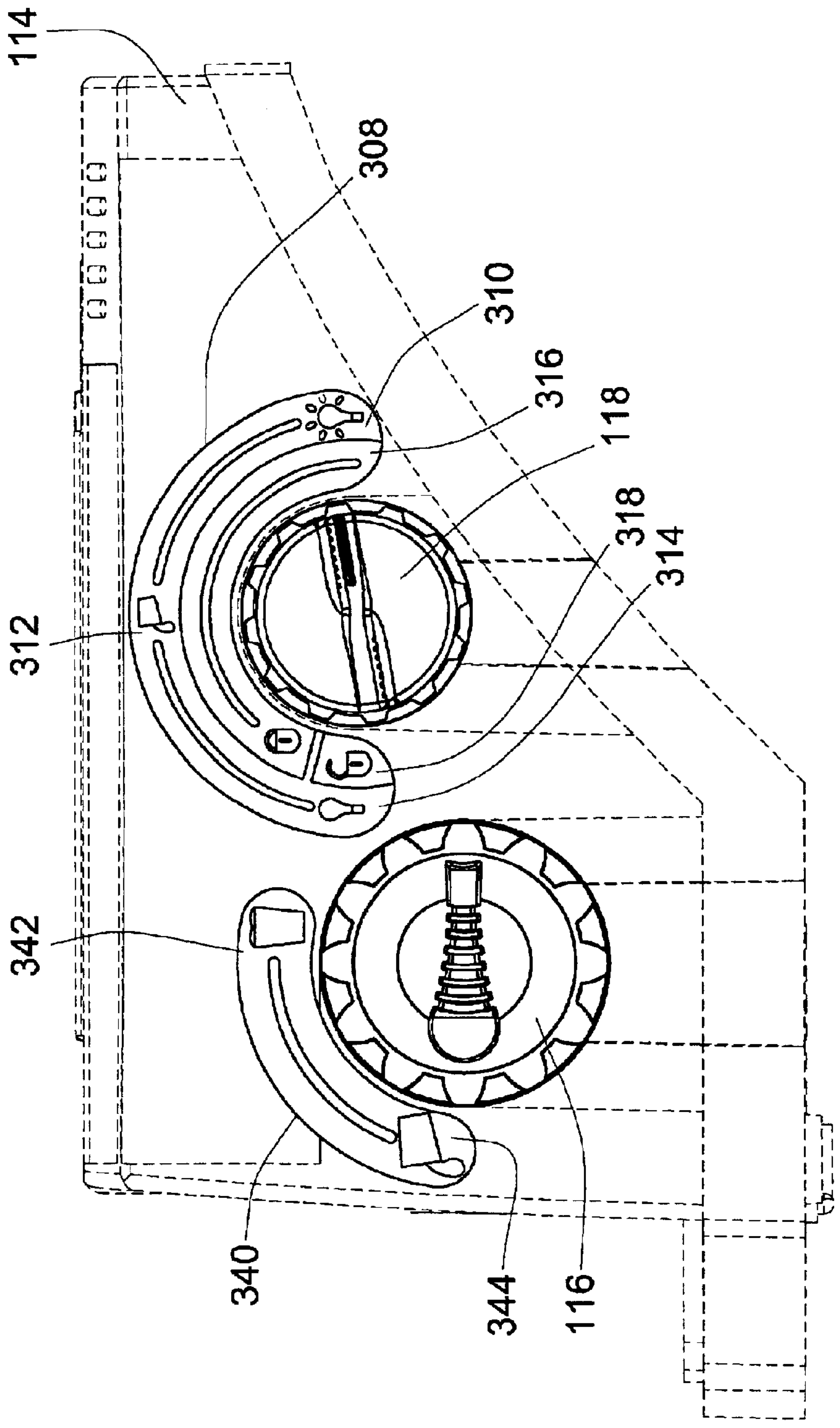
FIG. 19 is a partial side view of the crayon making apparatus showing an example of the indicators and display zones.

In addition, the indicator 308 may include graphic or textual display zones 316, 318, that display the locking condition of the cover 112. For example, display zone 316 may indicate that the cover 112 is locked. Display zone 318 may indicate that the cover 112 is unlocked. FIG. 19 shows one example of indicator 308 and display zones 310, 312, 314, 316, 318.

In addition, the knob 116 may have an indicator 340 and display zones 342, 344 which indicate the position of the knob 116 as shown in FIG. 1. FIG. 19 shows one example of an indicator 340 for the knob 116 with display zones 342, 344.

Thus, after the crayon material is inserted and the cover 112 is closed, the cover 112 will be locked when the user turns the knob 118 and activates the timer 220. The timer 220 may then activate and deactivate the heating bulb 134, as described, thus melting the crayon material. The user may then drain the liquefied crayon material into the mold 122 using the knob 116, all while the timer 220 is running and the cover 112 is locked. After a predetermined time has run, allowing the new crayons and any heated components to cool, the timer 220 unlocks the cover, as described above, and the user may remove the newly molded crayons. It is to be appreciated that, in keeping with the inventive scope, other types of timing devices, such as microprocessor control, among others, may be utilized.

As an additional safety feature, the embodiment may incorporate a tilt switch 320, as shown in FIG. 15, which cuts off power to the bulb 134 in case the base 110 is lifted or knocked over. The tilt switch 320 includes a switch lever 322, connected to a plunger 324. The plunger 324 protrudes from an opening 326, and is biased to so protrude, by the lever 322. The switch 320 also includes terminals 328, 330 that connect to a power supply, and the bulb 134, respectively, facilitating the power path to the bulb 134 when the switch 320 is closed.

When the base 110 is resting on a flat surface, the plunger 324 is pushed into the base 110. In this condition, the switch lever 324 is pushed upwards, and power can flow to the bulb 134. However, if the base 110 is lifted off the flat surface, or knocked over, the plunger 324 emerges from the opening, allowing the lever 326 to move downward. This causes the switch 320 to cut off power from the bulb 134. It is to be appreciated that other types of cut-off devices may be employed, while keeping within the inventive scope. These may include mercury switches, and rolling ball mechanisms, among others.

In conclusion, it is to be noted that preferred embodiments of this invention are described herein, including the best mode known to the inventors for carrying out the invention. Of course, variations of those preferred embodiments will become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A molding apparatus, the apparatus comprising:

a base;

a heating component mounted to the base;

a melt pan mounted to the base, the melt pan further being heatable by the heating component, the melt pan being configured to receive material to be melted and to facilitate the drainage of the melted received material from the melt pan;

a mold mounted to the base, the mold having a cavity and being configured to receive the melted material from the melt pan;

a cover, attachable to the base, and further having an open position and a closed position, wherein access to the melt pan is blocked by the cover in its closed position;

a locking mechanism, the locking mechanism includes a timer, the locking mechanism secures the cover in its closed position for a predetermined time.

2. The apparatus of claim 1, the mold further comprising two components wherein one of the components is removable from the base.

3. The apparatus of claim 2, further including a tab to attach the removable mold component to the base.

4. The apparatus of claim 1, the melt pan further having a melting position, wherein material is melted, and a pouring position from which the melted material drains into the mold.

5. The apparatus of claim 3, wherein a knob operates a linkage that moves the melt pan between the melting position and the pouring position.

6. The apparatus of claim 4, wherein the melt pan is pivotally attached to the base.

7. The apparatus of claim 1, wherein the melt pan is made of metal.

8. The apparatus of claim 1, wherein the cover is clear.

9. The apparatus of claim 1, wherein the cover includes a vent.

10. The apparatus of claim 1, wherein the cover is pivotally attached to the base.

11. The apparatus of claim 1, wherein the timer is a spring-operated timer.

12. The apparatus of claim 11, wherein the timer includes gears.

13. The apparatus of claim 1, wherein the cover includes a notch that is engaged by the locking mechanism.

14. The apparatus of claim 13, wherein the locking mechanism includes a slotted wheel that operates a linkage that facilitates engagement of the locking mechanism with the notch.

15. The apparatus of claim 1, wherein the timer controls the operation of the heating component.

16. The apparatus of claim 12, wherein the timer includes a escapement.

17. The apparatus of claim 15, further comprising a switch that actuates the heating component.

18. The apparatus of claim 17, wherein the timer includes a cam that controls the switch.

19. The apparatus of claim 1, wherein the heating component comprises an electric bulb.

20. The apparatus of claim 19, wherein the electric bulb is at least partially enveloped by a metal housing.

21. The apparatus of claim 1, wherein the heating element is controlled by a tilt switch.

22. The apparatus of claim 21, wherein the tilt switch includes a plunger connected to a switch lever.

23. The apparatus of claim 19, wherein the electric bulb is powered by alternating current.

24. The apparatus of claim 20 wherein the electric bulb is powered by direct current.

25. The apparatus of claim 1, wherein the cavity in the mold is elongated.

26. The apparatus of claim 25, wherein the cavity has a bottom and the cavity is tapered at the bottom.

27. The apparatus of claim 25, wherein the cavity is circular in cross-section.

28. The apparatus of claim 1, wherein the cavity is in the shape of a writing instrument.

29. The apparatus of claim 28, wherein the shape is a crayon.

30. The apparatus of claim 1, wherein the cavity has a top and the cavity is tapered at the top to create a funnel.

31. The apparatus of claim 2, wherein one of the mold components has a bead and the other mold component has a channel.

32. The apparatus of claim 1, wherein the melt pan has a channel.

33. An apparatus for melting crayon material, the apparatus comprising:

a base, a heating component disposed within the base, a melt pan that receives the crayon material, the melt pan being pivotally mounted to the base, and configured to absorb heat from the heating component, the melt pan further having a melting position wherein the crayon material is received and melted, and a pouring position, wherein the melted crayon material drain from the melt pan, a crayon mold, configured to receive the melted crayon material from the melt pan when it is in the pouring position, wherein the mold has a crayon-shaped cavity, the mold further being capable of disassembly, a cover pivotally mounted to the base, the cover further having a closed position, wherein it blocks access to the melt pan, and further having an open position wherein access to the melt pan is not blocked, a locking mechanism, the locking mechism includes a timer, the locking mechanism secures the cover in its closed position for a predetermined time, the timer further controlling the operation of the heating component.

34. A molding apparatus kit, the kit comprising:

crayon material; and a molding apparatus including:

a base;

a heating component mounted to the base;

a melt pan mounted to the base, the melt pan further being heatable by the heating component, the melt pan being configured to receive material to be melted and to facilitate the drainage of the melted received material from the melt pan;

a mold mounted to the base, the mold having a cavity and being configured to receive the melted material from the melt pan;

a cover, attachable to the base, and further having an open position and a closed position, wherein access to the melt pan is blocked by the cover in its closed position;

a locking mechanism, the locking mechanism includes a timer, the locking mechanism secures the cover in its closed position for a predetermined time.

35. The apparatus of claim 1, wherein access to the mold is blocked by the cover in its closed position.

36. The apparatus of claim 33, wherein access to the mold is blocked by the cover in its closed position.

* * * * *

UNITED STATES PATENT AND TRADEMARK OFFICE

CERTIFICATE OF CORRECTION

PATENT NO. : 6,902,387 B2
APPLICATION NO. : 10/017830
DATED : June 7, 2005
INVENTOR(S) : Cziraky It is certified that error appears in the above-identified patent and that said Letters Patent is hereby corrected as shown below:

Claim 24, Column 10, Line 27: “of claim 20” should read --of claim 19--.

Signed and Sealed this

Fifteenth Day of April, 2008

JON W. DUDAS
*Director of the United States Patent and Trademark Office*